United States Patent [19]

Skibbe et al.

[11] 3,870,202

[45] Mar. 11, 1975

[54] SPREADER WITH AGITATOR TO BREAK UP MATERIAL BRIDGING

[75] Inventors: Harold A. Skibbe; John H. Skibbe, both of Sodus, Mich.

[73] Assignee: Skibbe Manufacturing Co., Inc., Sodus, Mich.

[22] Filed: Jan. 28, 1974

[21] Appl. No.: 437,291

[52] U.S. Cl. ................... 222/226, 198/57, 239/680, 308/34
[51] Int. Cl. ............................................. A01c 19/00
[58] Field of Search .............. 259/2; 308/15, 18, 25, 308/31, 34; 239/680; 198/52, 53, 54, 57, 58; 222/177, 178, 226, 227, 236, 415

[56] References Cited
UNITED STATES PATENTS

| | | | |
|---|---|---|---|
| 225,757 | 3/1880 | Loehner | 308/34 |
| 227,634 | 5/1880 | Loehner | 308/34 |
| 874,311 | 12/1907 | Doran | 308/34 |
| 1,157,291 | 10/1951 | Bradsher | 239/680 X |
| 2,792,153 | 5/1957 | Douglass, Jr. | 222/226 |
| 3,610,474 | 10/1971 | Usher et al. | 222/178 |
| 3,776,431 | 8/1972 | Riley | 222/178 |

*Primary Examiner*—Robert B. Reeves
*Assistant Examiner*—David A. Scherbel

[57] ABSTRACT

The hopper of a spreader for agricultural materials has a driven mesh feed belt in the bottom to feed loose material to a distributor wheel. Bearings are removably attached to the sides of the hopper on opposite sides of the belt to support two cross shafts over the belt. A first sprocket on one shaft engages the belt and is driven thereby. Other sprockets on each shaft carry a chain loop for rotation within the hopper, and tines on the chain break up hardened material such as lime which may tend to bridge over the belt in the hopper. The bearings for the cross shafts have mounting tongues slidably and removably engaged under cleats fixed to the insides of the hopper, and a turnbuckle adjusts one cleat to tighten the chain of the breaker. A removable cleat locks the other bearing in its slidably located position.

5 Claims, 4 Drawing Figures

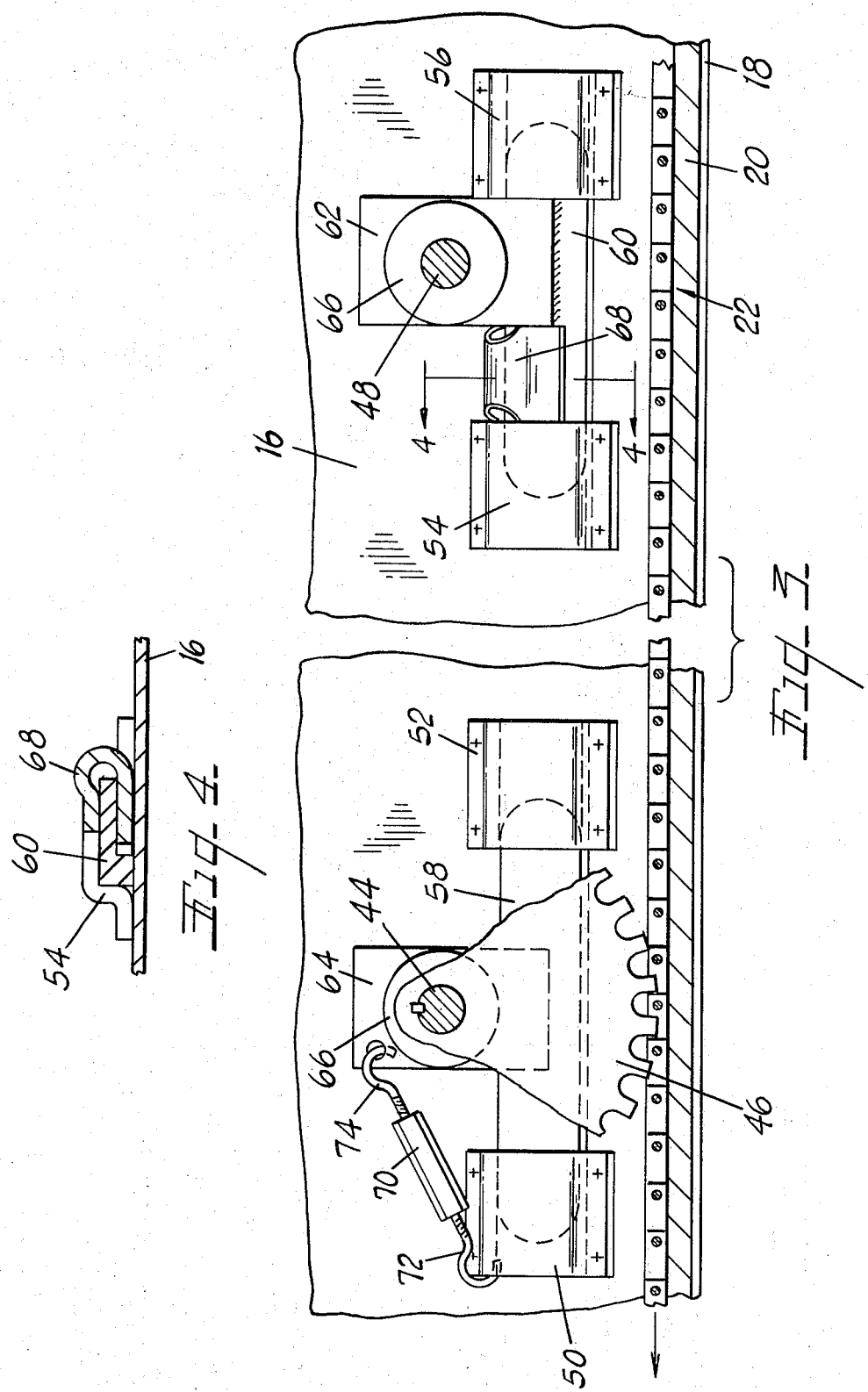

SPREADER WITH AGITATOR TO BREAK UP MATERIAL BRIDGING

OUTLINE OF INVENTION

Mechanical spreaders having driven feed belts at the bottoms of hoppers for delivering bulk fertilizer and other agricultural materials to spreading mechanisms are old, and operate satisfactorily as long as the material being spread is dry. However, agricultural lime and other damp materials tend to cake in the hopper and bridge over the feed belts. The present invention provides a clod and bridge breaking chain loop that can be removably mounted within the hopper of a spreader to keep wet or caked material feeding to feed belts and distributing apparatus.

DESCRIPTION

The drawings, of which there are two sheets, illustrate a preferred form of the clod and bridge breaking apparatus.

FIG. 3 is a fragmentary cross sectional view showing the mounting of the breaker chain and is taken along the plane of the line 3—3 in FIG. 2.

FIG. 4 is a fragmentary cross sectional view taken along the plane of the line 4—4 in FIG. 3 and illustrating the lock for removably holding the breaker apparatus in place.

Figures 1, 2:
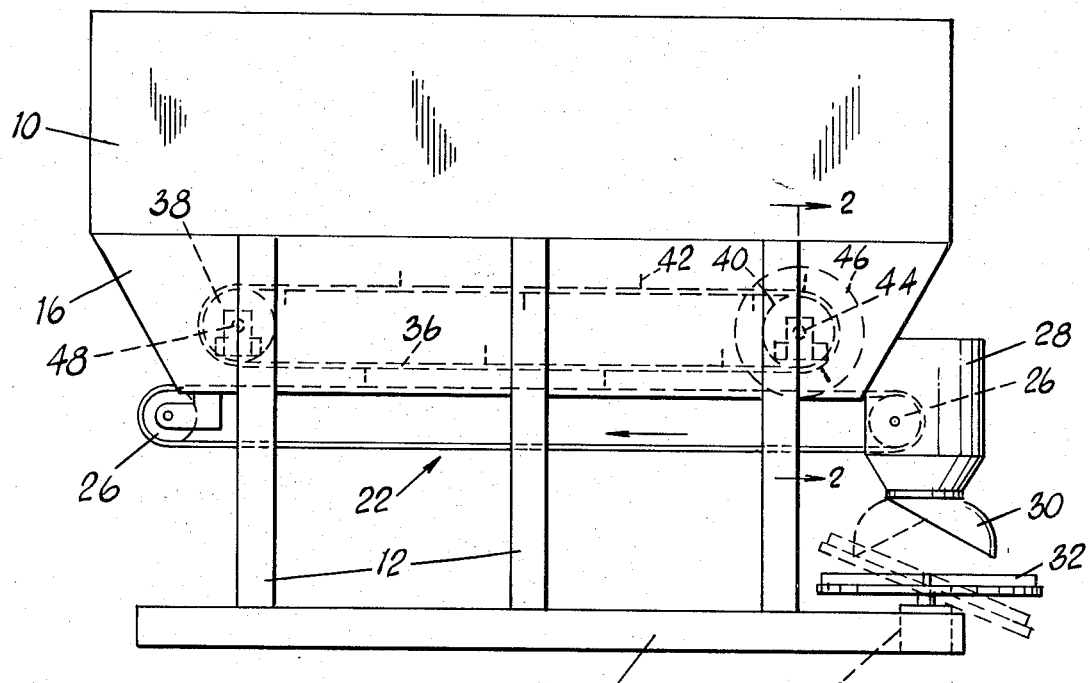
FIG. 1 is a side elevational view of an agricultural spreader having driven feeding and distributing parts.
FIG. 2 is an enlarged fragmentary cross sectional view taken along the plane of the line 2—2 in FIG. 1.

The spreader, which is old, consists of a hopper body 10 supported on suitable leg or post elements 12 from a base 14. The base may have its own wheels (not illustrated) or may be placed in a suitable transporting vehicle. The hopper has converging lower side walls 16 with spaced flanges 18 which support a removable wooden bottom strip 20. An open mesh link feed belt 22 consisting of pin connected zig-zag links 24 is trained around rollers or sprockets 26. One of the sprockets is driven by a motor or drive connection (not illustrated) to move the upper reach of the belt rearwardly, to the right, into a distributor chute 28 having a rotatable spout 30. The spout may be rotated between the full and dotted line positions shown to deliver material to any position around a distributor disc 32. The disc is driven by a motor 34 and may be tilted as shown in dotted lines to distribute or determine the direction in which the material will be thrown.

Dual feed belts and distributor discs may be provided on a single spreader hopper, but since the clod and bridge breaking apparatus would be duplicated on each, only one is illustrated. It should be noted, however, that the clod breaking chain derives its drive and power from the feed belt with which it is associated, so if two feed belts and two breaker chains are provided, one set may run at a different speed than the other.

The clod and bridge breaking mechanism comprises a chain loop 36 trained around an idler sprocket 38 and a driven sprocket 40. U-shaped tines 42 are welded in inwardly and outwardly extending relation to knuckle joints or other parts of the chain loop at spaced intervals thereround. The driven sprocket 40 is mounted on a shaft 44 which also carriers a drive sprocket 46 which meshes with the spreader belt 22 to be driven at the same speed as the feed belt. A similar shaft 48 but without a drive sprocket supports the idler sprocket 38 as will be described.

As appears most clearly in FIGS. 2 and 3, the inclined side walls 16 of the hopper body are provided with two sets of U-shaped cleats 50–52 and 54–56 welded or otherwise secured to the side walls towards each end of the hopper. The cleats slidably receive and removably retain mounting plates 58 and 60. Each plate has an upstanding plate or leg 62 or 64 welded thereon and the legs support bearings 66 which receive and support the shafts 44 and 48. The shaft 44 is supported so that the sprocket 46 engages the feed belt 22 as previously described. The shaft 48 may be supported at a slightly higher level.

The plates 58 and 60, identified by their round ends, are slid endwise first under their associated cleats 50 and 54 until their other ends can be slid oppositely under the cleats 52 and 56 respectively. Plates 62 are then locked in their most forward position by slipping U-shaped spring straps 68 over the side of plate 60 between cleat 54 and the side of bearing support plate or leg 62. Plates 60 are notched on their undersides to receive the back or lower arms of the spring straps.

The rear plates 58 and bearing posts 64 are then drawn rearwardly or to the left in FIG. 3 to tighten the chain loop 36. Turnbuckles 70 have threaded bolt 72 hooked around the end of cleats 50, while their other threaded bolt 74 is hooked through a hole in bearing post 64.

The breaker chain loop 36, its supporting shafts 44 and 48 and bearings 66 can thus be firmly but removably mounted in the hopper 10, in driving engagement with the existing driven spreader feed belt 22 of the spreader.

What is claimed as new is:

1. In a spreader for agricultural materials having a material receiving hopper with a driven material feed belt in the bottom thereof,
    means for breaking clods and bridges in the material being fed comprising a chain loop located near the bottom of said hopper and having material breaking tines secured thereto at spaced intervals around said chain loop,
    sprockets on shafts supporting said chain loop,
    a drive sprocket on one of said shafts drivingly engaged with said feed belt,
    and bearings for the ends of said shafts supported on the sides of said hopper.

2. In a spreader as defined in claim 1, retaining elements permanently secured to the inner sides of said hopper,
    and interlocking parts on said bearings removably engageable with said retaining elements.

3. A spreader as defined in claim 2 in which said retaining elements are U-shaped straps secured in spaced pairs to the sides of said hopper,
    and in which said interlocking parts are plates connected to the bearings and slidably engageable at their ends under said straps.

4. A spreader as defined in claim 3 which further includes,
    turnbuckles having one hooked end engageable with one of said U-shaped straps and another hooked end clampingly engageable with the bearing slidably associated with said last mentioned strap.

5. A spreader as defined in claim 4 which further includes,
    a U-shaped spacer clip removably engageable over an edge of one of said bearing support plates between the bearing and the opposed side of one of the U-shaped straps associated with the bearing.

* * * * *